Patented Aug. 22, 1939

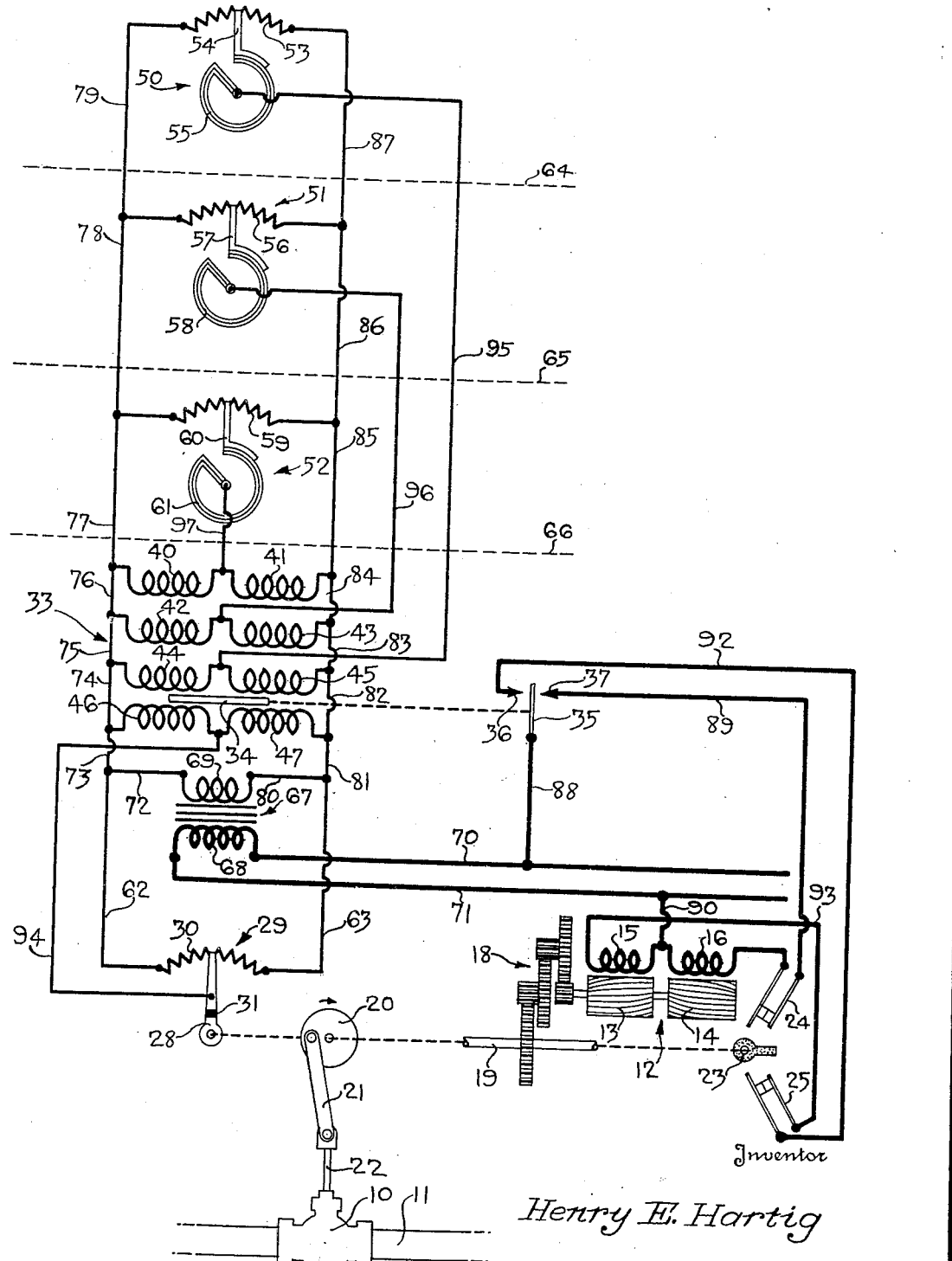

2,170,072

UNITED STATES PATENT OFFICE 2,170,072

CONTROL SYSTEM

Henry E. Hartig, Robbinsdale, Minn., assignor to Minneapolis-Honeywell Regulator Company, Minneapolis, Minn., a corporation of Delaware Application November 4, 1936, Serial No. 109,122

11 Claims. (Cl. 236—74)

My invention relates to a control system and more particularly to one of the proportioning type. wherein a controlled element is variably positioned in accordance with the position of a control potentiometer.

In control systems of the type referred to above, it is common to employ a plurality of potentiometers which jointy control the energization of the windings of a relay which in turn controls a motor or some other electrically operated device. One of the methods employed in such a system is to employ a relay having a set of opposing windings in which the junction of the two windings is connected to the contacts of each of the potentiometers and in which the two windings in series were connected in parallel with the various control potentiometers across the source of power. This type of system has the disadvantage that unless protective resistances are employed a short-circuit condition will result whenever the contacts of two of the potentiometers are in opposite extreme positions. The employment of protective resistances has the disadvantage that the portion of the resistance in the circuit constituted by the protective resistances plays no part in varying the energization of the windings of the relay. The above described system has the further disadvantage that where three or more control potentiometers are employed and the contacts of two of these are in opposite extreme positions, the other control potentiometers lose control entirely unless protective resistances are inserted, and even in this case the controlling effect of the other potentiometers is materially diminished.

The present invention has as its general object to devise a system of the general type previously discussed wherein the need of protective resistances is eliminated. This is done in the present invention by providing as many sets of relay windings as there are potentiometers.

An object of the present invention is accordingly to provide a control system employing a relay having a plurality of normally balanced windings, the energization of which is controlled by a like number of potentiometers, the relay being provided with one set of windings for each potentiometer.

A further object of the present invention is to provide a control system employing a relay having normally balanced windings, the energization of which is controlled by three or more potentiometers, in which there is one set of relay windings for each potentiometer, so that each potentiometer retains control of the energization of the relay windings regardless of the position of the other potentiometers.

A further object of the present invention is to provide a temperature control system employing a motor controlled by a control system of the type set forth in the preceding counts.

Further objects of the present invention will be apparent from a consideration of the accompanying specification, claims and drawing.

For a more complete understanding of the invention reference is made to the accompanying drawing. In this drawing the control system is illustrated as applied to the control of a steam valve of a heating system, the control potentiometers being actuated by temperature responsive elements located in spaces which are to be heated.

Referring specifically to the details of the drawing, the steam valve is designatedf by the reference numeral 10. The term valve is used to refer to the fluid flow controlling portion of the valve mechanism and, accordingly, any reference to varying the position of the valve is intended to refer to varying the amount of fluid passed by the valve. The steam valve is shown as controlling the flow of steam through a steam line 11. A motor 12 is employed for varying the position of valve 10. Motor 12 is of the reversible type and comprises a pair of rotors 13 and 14 with which are associated field windings 15 and 16, and a motor of the type wherein the rotation thereof is in one direction when field winding 15 is energized and in the opposite direction when field winding 16 is energized. The motor is connected through a reduction gear train 18 to a shaft 19. Secured to the shaft 19 is a crank disc 20, and fastened adjacent to the outer edge of crank disc 20 is a link 21 which connects the crank disc to the stem 22 of valve 10. It will be readily seen that rotation of the shaft in either direction affects the position of valve stem 22 and consequently of valve 10.

Secured to the right-hand end of shaft 19 is an arm 23 of insulating material. This arm 23 is adapted to cooperate with limit switches 24 and 25. Each of these limit switches comprises a relatively short arm and a relatively long arm, the latter of which is adapted to be engaged by arm 23 when shaft 19 has rotated to a position wherein the valve is in substantially an extreme position. Upon arm 23 engaging the long arm of one of the limit switches, this arm is caused to be moved away from the other arm to separate the contacts of the limit switch. The purpose of the limit switches is to insure that the motor will be stopped upon the valve reaching either extreme position.

Secured to the left end of shaft 19 is a contact arm 28 of a potentiometer 29. Potentiometer 29 comprises in addition to control arm 28 a resistance 30 over which the contact arm 28 is adapted to slide. Contact arm 28 is formed in two sections which are retained together by a joint 31 of insulating material. It will be readily seen that rotation of shaft 19 in either direction varies the position of contact arm 28 on resistance 30. The potentiometer 29 is accordingly driven by the motor 12 and, as will be more apparent from the subsequent description, acts to rebalance the energization of a relay 33 after the same has been unbalanced by the action of one of the control potentiometers.

The relay 33 comprises a movable armature 34 which is operatively connected with a switch blade 35. The switch blade 35 is adapted to be moved into engagement with either of two contacts 36 and 37. Associated with armature 34 are relay windings 40, 41, 42, 43, 44, 45, 46 and 47. Each of relay windings 40 and 41, 42 and 43, 44 and 45, and 46 and 47 are connected in series to form a pair of windings. As a result there are four pairs of relay windings. These windings are so related to armature 34 that upon the energization of the right-hand windings being equal to the energization of the left-hand windings the position of armature 34 will be such that switch blade 35 will be in its neutral position shown in the drawing, wherein it is in engagement with neither contacts 36 nor 37.

Controlling the energizations of the relay windings of relay 33 are potentiometers 50, 51 and 52, in addition to the previously mentioned potentiometer 29. Each of the control potentiometers 50, 51 and 52 is shown, for purposes of illustration, as a temperature actuated potentiometer wherein the position of the contact arm is varied in accordance with temperature. Potentiometer 50 comprises a resistance 53, a contact arm 54 and a bimetallic element 55 to which contact arm 54 is connected. It will be readily seen that the position of contact arm 54 is determined by the temperature to which bimetallic element 55 is subjected. Similarly, control potentiometer 51 consists of a resistance 56, a contact arm 57, and a bimetallic element 58 to which contact arm 57 is secured. Likewise, control potentiometer 52 comprises a resistance 59, a contact arm 60 and a bimetallic element 61. The various temperature responsive potentiometers 50, 51 and 52 may be located at any suitable control points and may respond to any of various conditions. Thus, one of these may respond to outside temperature, another to room temperature, and a third to water temperature. Or, each of these thermostatically controlled potentiometers may be actuated in accordance with the temperature of a space in a particular compartment of an enclosure. For example, in a building where there is a large number of rooms wherein it is desired to maintain an average temperature, these potentiometers may be located in various of the rooms or compartments. Lines 64, 65 and 66 illustrate the divisions between various compartments in which the thermostatically controlled potentiometers may be located.

A transformer 67 is employed to supply low voltage power for the operation of the relay. Transformer 67 comprises a line voltage primary 68 and a low voltage secondary 69. The primary 68 is connected to line wires 70 and 71 leading to a suitable source of power (not shown).

The left-hand terminals of the potentiometers 29, 50, 51 and 52 and the relay coils 40, 42, 44 and 46 are all connected to the left-hand terminal of secondary 69 through conductors 62 and 72 to 79. Similarly, the right-hand terminals of the four potentiometers and of the relay coils 41, 43, 45 and 47 are connected through conductors 63 and 80 to 87 to the right-hand terminal of the secondary 69. The contact arm 31 of the rebalancing potentiometer 29 is connected through conductor 94 with the junction of relay coils 46 and 47. The contact arm 54 of control potentiometer 50 is connected through bimetallic element 55 and conductor 95 to the junction of relay coils 44 and 45. Similarly, the contact arm 57 of control potentiometer 51 is connected through bimetallic element 58 and conductor 96 to the junction of relay coils 42 and 43. In a similar manner, the contact arm 60 of control potentiometer 52 is connected through bimetallic element 61 and conductor 97 to the junction of relay coils 40 and 41.

It will be apparent from the preceding description of the manner in which the potentiometers and relay coils are connected together to the source of energy that each of the potentiometers acts to control the voltage impressed upon the respective coils of one of the pairs of relay windings. Thus, inasmuch as the resistance element of potentiometer 50 is connected directly across the transformer and the contact arm 54 is connected directly to the junction of relay coils 44 and 45, the relative voltage impressed upon relay coils 44 and 45 and consequently the relative energization of these coils will be determined by the position of contact arm 54 of control potentiometer 50. Any movement of contact arm 50 to the right will decrease the voltage across relay coil 45 and increase the voltage across relay coil 44, and correspondingly decreases and increases respectively the energizations of these two coils. Similarly, the shifting of contact arm 57 of control potentiometer 51 has the same effect upon the relative energization of relay coils 42 and 43. A similar effect is had on the relative energizations of relay coils 40 and 41 by a shift in the position of potentiometer 52. Similarly, potentiometer 29 controls the relative energizations of relay coils 46 and 47.

The control system is illustrated with the elements in the position assumed when all of the temperatures are at the desired value and in which every one of the control devices is in its mid position. The valve 10 will be in a position where under normal conditions the flow of fluid admitted thereby will maintain the various temperatures at the desired value. If for any reason the temperature to which the thermostatic element of one of the potentiometers is exposed changes, that control potentiometer will be shifted in position to unbalance the energization of one set of coils and consequently unbalance the relay. Let it be assumed, for example, that the temperature in the space in which the potentiometer 50 is located decreases. In each of the control potentiometers 50, 51 and 52 the bimetallic elements are so arranged that upon a decrease in temperature the contact arm is deflected to the left. Thus upon a decrease in temperature occurring in the space in which control potentiometer 50 is located, the contact arm 54 will be deflected to the left. In view of the foregoing description, it will be obvious that upon contact arm 54 being so moved, the energization of relay winding 45 will be increased and the energization of relay winding 44 will be decreased. Under these circumstances the total energizations of the windings on the right-hand side will become greater than those on the left with the result that armature 34 is drawn to the right, moving switch blade 35 into engagement with contact 37.

Upon the switch blade 35 being moved into engagement with contact 37 the following circuit is established to field winding 16: from line wire 70 through conductor 88, switch blade 35, contact 37, conductor 89, limit switch 24, field winding 16 and conductor 90 to the other line wire 71. The energization of field winding 16 causes the motor to rotate in such a direction as to rotate shaft 19, and so as to cause crank disc 20 to rotate in the direction of the arrow adjacent the same. Such rotation of crank disc 20 will cause valve 10 to be moved towards open position. At the same time, control arm 31 is moved to the right. The moving of control arm 28 to the right, as previously explained, decreases the energization of relay winding 47 and increases the energization of relay winding 46. The rotation of motor 12 and the resultant movement of the valve and movement of contact 28 continues until the unbalancing of the energization of windings 46 and 47 compensates for the unbalancing of windings 44 and 45. When this occurs the energization of the right-hand set of windings will again balance that of the left-hand set of windings so as to cause switch 35 to again assume an intermediate position between contacts 36 and 37.

The condition previously assumed is that occurring when the temperature decreases in the space in which the temperature sensitive element of the control potentiometer is located. Let it be assumed, that the temperature in one of the other spaces or compartments rises. If, for example, the temperature to which the bimetallic element 58 is subjected rises contact arm 57 will be moved to the right, decreasing the portion of the resistance in the right-hand side of resistance 56 and increasing the portion in the left-hand side thereof. It will be recalled from the previous description that the result of moving contact arm 57 to the right is to increase the energizations of relay coil 42 and decrease the energization of relay coil 43. This will result in the energization of the left-hand windings being greater than that of the right-hand windings, causing armature 54 to be moved to the left and moving switch blade 35 into engagement with contact 36.

When switch blade 35 is moved into engagement with contact 36 the following circuit is established through field winding 15: from line wire 70 through conductor 88, switch blade 35, contact 36, conductor 92, limit switch 25, conductor 93, field winding 15, and conductor 90 to the other line wire 71. The energization of field winding 15 is a result of the establishment of this circuit is effective to cause motor 12 to rotate in a direction such as to rotate crank disc 20 in the opposite direction to that indicated by the arrow adjacent the same. Such rotation of crank disc 20 will cause valve 10 to be adjusted towards closed position, decreasing the supply of steam to the radiators or other steam utilizing device. The rotation of the motor 12 in this direction will also cause contact arm 28 to move towards the left. The movement of contact arm 28 towards the left results in a decrease in the energization of relay coil 46 and an increase in the energization of the relay coil 47. This tends to counteract the unbalance in the energization of relay coils 42 and 43 by the deflection of contact arm 37 to the right. This movement of motor 12 will continue until the relative energizations of relay coils 46 and 47 equalizes and compensates for the change in the relative energizations of coils 42 and 43 effected by the control potentiometer, at which time the energization of the relay will again be balanced and switch arm 35 will again be moved to its neutral position.

It is deemed unnecessary to further explain the action in detail in connection with movements of the contact arm 60 of control potentiometer 52. It is believed obvious from the preceding descriptions that movement of the contact arm 60 to the left will unbalance the relay and cause the motor to rotate in a direction to open the valve and to move contact arm 28 to the right so as to rebalance the relay. Similarly, movement of the contact arm 60 to the right will cause the relay to be unbalanced in such a direction that the motor will be rotated to close the valve and to move contact arm 35 to the left to restore the balance of the relay.

It will be noted from the preceding description that each of the potentiometers 50, 51, 52 and 29 control the relative energization of one pair of relay windings. This control is disturbed in no way by the position assumed by any of the other potentiometers. Thus, even though contact arm 54 should move to the extreme right, placing winding 44 directly across the line and completely short-circuiting winding 45, and contact arm 60 should move completely to the left short-circuiting winding 40 and placing winding 41 directly across the line, control would still be exercised by potentiometer 51 since the relative energizations of windings 42 and 43 would still be a controlling factor and the relative energizations of these two windings would be determined solely by the position of contact arm 57. It will further be noted in the extreme case just mentioned, that there is no direct short-circuit between two sides of the line as is provided with the arrangement discussed in the early portion of the specification. Thus, there is no need of protective resistance and all of the resistances in the circuit are effective in controlling the relative energizations of the right and left hand sets of relay windings.

It will readily be seen that I have provided a control system wherein it is possible to have a plurality of control potentiometers for controlling the energization of the windings of a relay in which it is not necessary to employ protective resistances and wherein control is retained by all of the potentiometers regardless of the position assumed by any one or more of them. It will further be seen that I have provided this by a very simple and highly practicable arrangement. While I have shown the same in connection with a temperature control system, it specifically is not so limited although it is of particular applicability in that connection. Moreover, where it is employed in a temperature control system it is obvious that the temperature control system is not to be limited to a steam heating system. The motor 12 can just as well modulate the position of a damper or a fuel valve as a steam valve.

In general it is to be understood that the specific embodiment shown in the drawing and described in the above specification is for the purpose of illustration only, and that my invention is to be limited only by the scope of the accompanying claims.

I claim as my invention:

1. In combination, an electrically operated device, circuit connections for said device including a switch, operating means for said switch comprising two opposed sets of electromagnetic windings, each set comprising a plurality of portions, said means being effective upon unequal energization of the two sets of windings to move said switch to either of two extreme circuit controlling positions, a source of electrical energy for energizing both sets of windings, and means including a plurality of potentiometers controlling the relative energizations of said sets of windings, each of said potentiometers controlling the energization of a separate portion of each set of windings.

2. In combination, an electrically operated device, circuit connections for said device including a switch, operating means for said switch comprising a plurality of pairs of electromagnetic windings, the windings of each pair being connected in series, control means for said windings including a plurality of potentiometers, one for each pair of windings, each of said potentiometers comprising a relatively movable resistance and contact, a source of electrical energy, means connecting said source of energy across the ends of each pair of windings and across the ends of the resistance of each potentiometer, and means connecting the movable contact of each potentiometer to the junction of the windings of its respective pair of windings.

3. In combination, an electrically operated device, circuit connections for said device including a switch, operating means for said switch comprising at least three pairs of electromagnetic windings, the windings of each pair being connected in series, control means for said windings including at least three potentiometers, one for each pair of windings, each of said potentiometers comprising a relatively movable resistance and contact, a source of electrical energy, means connecting said source of energy across the ends of each pair of windings and across the ends of the resistance of each potentiometer, and means connecting the movable contact of each potentiometer to the junction of the windings of its respective pair of windings.

4. In combination, an electrically operated device, circuit connections for said device including a switch, an armature connected to said switch, a plurality of pairs of electromagnetic windings, the windings of each pair being connected in series and the corresponding windings of said pairs of windings being disposed with respect to said armature so as to form two sets of windings which exert an opposite action upon said armature, control means for said windings including a plurality of potentiometers, one for each pair of windings, each of said potentiometers comprising a relatively movable resistance and contact engaging said resistance, a source of electrical energy, means connecting said source of energy across the end of each pair of windings and across the ends of the resistance of each potentiometer, and means connecting the movable contact of each potentiometer to the junction of the windings of the respective pair of windings.

5. In a remote control system, a reversible motor, a control potentiometer and a rebalancing potentiometer, each comprising a relatively movable resistance and contact, condition responsive means for controlling the relative position of the resistance and contact of the control potentiometer, an operative connection between the motor and the rebalancing potentiometer effective to control the relative position of the resistance and contact of the rebalancing potentiometer, circuit connections for said motor including a switch, operating means for said switch comprising a pair of opposed windings for each of said potentiometers, a source of energy, and connections between said source of energy and between each potentiometer and its associated pair of windings for controlling the relative energization of the windings of said pair.

6. In a condition control system, condition changing means, regulating means therefor comprising a reversible motor, a control potentiometer and a rebalancing potentiometer each comprising a relatively movable resistance and contact, condition responsive means for controlling the relative positions of the resistance and contact of the control potentiometer, an operative connection between the motor and the rebalancing potentiometer effective to control the relative position of the resistance and contact of the rebalancing potentiometer, circuit connections for said motor including a switch, operating means for said switch comprising a pair of opposed electromagnetic windings for each of said potentiometers, a source of energy, and connections between said source of energy and between each potentiometer and its associated pair of windings for controlling the relative energization of the windings of said pair.

7. In a condition control system, condition changing means, regulating means therefor comprising a reversible motor, a plurality of control potentiometers, and a rebalancing potentiometer, each comprising a relatively movable resistance and contact, a condition responsive means for each control potentiometer operative to control the relative positions of the resistance and contact thereof, an operative connection between the motor and the rebalancing potentiometer effective to control the relative position of the resistance and contact of the rebalancing potentiometer, circuit connections for said motor including a switch, operating means for said switch comprising a pair of opposed electromagnetic windings for each of said potentiometers, a source of energy, and connections between said source of energy and between each potentiometer and its associated pair of windings for controlling the relative energization of the windings of said pair.

8. In a temperature control system for an enclosure having a plurality of compartments, temperature changing means, regulating means therefor including a motor, circuit connections for said motor including a switch, control means for said switch including a plurality of temperature responsive variable resistances, each located in one of said compartments, operating means for said switch comprising a plurality of electromagnetic windings, one for each of said variable resistances, a source of energy and connections between said source of energy and between each of said variable resistances and its respective winding.

9. In a condition control system for an enclosure having a plurality of compartments, condition changing means, regulating means therefor comprising a reversible motor, a plurality of control potentiometers each comprising a relatively movable resistance and contact, a condition responsive means for each control potentiometer operative to control the relative positions of the resistance and contact thereof, circuit connections for said motor including a switch, operating means for said switch comprising a pair of opposed electromagnetic windings for each of said potentiometers, a source of energy, and connections between said source of energy and between each potentiometer and its associated pair of windings for controlling the relative energization of the windings of said pair.

10. In a condition control system for an enclosure having a plurality of compartments, condition changing means, regulating means therefor comprising a reversible motor, a plurality of control potentiometers and a rebalancing potentiometer, each comprising a relatively movable resistance and contact, a condition responsive means for each control potentiometer operative to control the relative positions of the resistance and contact thereof, an operative connection between the motor and the rebalancing potentiometer effective to control the relative position of the resistance and contact of the rebalancing potentiometer, circuit connections for said motor including a switch, operating means for said switch comprising a pair of opposed electromagnetic windings for each of said potentiometers, a source of energy, and connections between said source of energy and between each potentiometer and its associated pair of windings for controlling the relative energization of the windings of said pair.

11. In a temperature control system for an enclosure having a plurality of compartments, temperature changing means, regulating means therefor comprising a reversible motor, a plurality of control potentiometers and a rebalancing potentiometer, each comprising a relatively movable resistance and contact, a temperature responsive means for each control potentiometer operative to control the relative positions of the resistance and contact thereof, an operative connection between the motor and the rebalancing potentiometer effective to control the relative positions of the resistance and contact of the rebalancing potentiometer, circuit connections for said motor including a switch, operating means for said switch comprising a pair of opposed electromagnetic windings for each of said potentiometers, a source of energy, and connections between said source of energy and between each potentiometer and its associated pair of windings for controlling the relative energization of the windings of said pair.

HENRY E. HARTIG.

CERTIFICATE OF CORRECTION.

Patent No. 2,170,072.　　　　　　　　　　　　　　　　August 22, 1939.

HENRY E. HARTIG.

It is hereby certified that error appears in the printed specification of the above numbered patent requiring correction as follows: Page 4, second column, line 2, claim 5, before the word "windings" insert electromagnetic; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.